(12) United States Patent
Miyazaki et al.

(10) Patent No.: US 8,466,408 B2
(45) Date of Patent: Jun. 18, 2013

(54) SURFACE FILM FOR POLARIZING SHEET AND POLARIZING SHEET USING SAME

(75) Inventors: Yuichi Miyazaki, Tokyo (JP); Yasuki Suzuura, Saitama (JP); Satoko Maenishi, Saitama (JP); Keiko Tazaki, Chiba (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 670 days.

(21) Appl. No.: 12/222,064

(22) Filed: Jul. 31, 2008

(65) Prior Publication Data

US 2009/0279170 A1  Nov. 12, 2009

(30) Foreign Application Priority Data

Jul. 31, 2007  (JP) .................................. 2007-199285

(51) Int. Cl.
*G02F 1/01* (2006.01)
(52) U.S. Cl.
USPC .......... 250/225; 250/338.1; 235/115; 283/85; 283/102; 283/90; 283/91; 283/93; 359/352
(58) Field of Classification Search
USPC .. 250/225, 338.1; 359/352; 235/115; 283/85, 283/90–91, 93
See application file for complete search history.

(56) References Cited

U.S. PATENT DOCUMENTS

| 5,856,048 A * | 1/1999 | Tahara et al. .................. 430/1 |
| 2006/0215077 A1* | 9/2006 | Majumdar et al. ............ 349/88 |
| 2007/0290047 A1* | 12/2007 | Tazaki et al. ................. 235/491 |

FOREIGN PATENT DOCUMENTS

| JP | 9-133810 A | 5/1997 |
| JP | 11-293252 A | 10/1999 |
| JP | 2001-243006 A | 9/2001 |
| JP | 2003-256137 A | 9/2003 |

* cited by examiner

*Primary Examiner* — Georgia Y Epps
*Assistant Examiner* — Kevin Wyatt
(74) *Attorney, Agent, or Firm* — Smith Patent Office

(57) ABSTRACT

Provided is a surface film for a polarizing plate in which transparent patterns having a non-visible light reflective regularity are printed on a surface of a substrate and in which a reflection preventive layer or an antiglare layer is formed thereon or on a back side thereof, wherein an ink constituting the above transparent patterns contains a material reflecting a non-visible light. Capable of being provided is a surface film which can suitably be used for providing additional informations to an image display medium in such a manner that data are input by handwriting directly on a display device and in which the function described above is built-in from the beginning without making it necessary for the user to stick later a sheet having the above function.

24 Claims, 4 Drawing Sheets

SURFACE FILM FOR POLARIZING SHEET AND POLARIZING SHEET USING SAME

BACKGROUND OF THE INVENTION

1. Field of the Invention

The present invention relates to a surface film for a polarizing plate which is adhered onto a surface of a polarizing plate or used as a part of a polarizing plate and a polarizing plate prepared by using the above surface film.

2. Description of the Related Art

In recent years, increased is necessity to convert handwritten characters, pictures, marks and the like to electronic data which can be handled by information processing devices, and in particular, increased is demand to systems in which handwritten informations are input into a computer and the like in real time without passing through a read device such as a scanner and the like.

In order to meet the above situations, proposed are, for example, write type input devices equipped with an input means comprising a pen for handwriting and a face to be written thereon, an input line read means for reading an input line in handwriting input by means of the above input means, an input line converting means for converting the above input line informations into electronic data and an input line data sending means for sending the data converted by the above input line converting means to an information processing device, wherein the input line read means described above is carried out by reading marks which provide position informations formed on the face to be written by means of a sensor mounted in a pen; the above face to be written is a specific paper on which specific dot patterns absorbing an infrared ray are printed as the marks for providing the position informations; and the pen described above is equipped with an infrared ray irradiating part for irradiating the above face to be written with an infrared ray and an infrared ray sensor for detecting infrared ray patterns reflected by the above dot patterns.

Further, proposed as well are write type input devices in which a pressure-sensitive sensor, an electrostatic sensor, a light sensor and the like is mounted on a writing panel and in which an input line is obtained by detecting a pen pressure, a static charge or a shadow in handwriting on the surface of the above panel with a stylus type pen or a finger.

In the former devices, handwritten contents (input lines) can be converted into electronic data, but a direct input target is a dedicated paper, and a separate display device is required in order to display the input line informations converted into the electronic data. Line informations can be visualized on paper by using a pen tip which is charged with graphite or an ink so that lines can be recorded on paper. In any event, however, it is not suited to such intuitive and interactive operation as inputting line informations by handwriting to charts shown on a display, and a broader work space in inputting is required. Further, when recording lines on paper, a sheet in which handwriting input has once been finished can not be used, and therefore paper for input which is a consumable good has to be always stored, so that such operation is not suited particularly to mobile uses.

On the other hand, the latter devices are equipped with a pressure-sensitive sensor, an electrostatic sensor and the like on a panel to be written thereon and therefore are difficult to be reduced in a size as an input device in comparison with the former devices, and they are increased in a weight and a thickness. Further, they are expensive in terms of a cost. In addition thereto, a pressure-sensitive sensor and an electrostatic sensor have a possibility to operate mistakenly when hands or cuffs are bought into contact with them, and therefore they are not suited to a writing way in which a palm on a little finger side is bought into contact with a panel as is the case with a usual way of writing on a note. In the above devices, such intuitive and interactive operation as inputting line informations by handwriting to charts shown on a display is made possible by disposing a writing panel prepared by using a transparent material on a front face of a display or providing a writing panel itself with a display function. In the case of the present system, however, it is expensive and therefore hard to be increased in a screen. Further, it is hard to be reduced in a size and a weight and therefore is not suited as well to mobile uses such as portable phones and the like.

Accordingly, desired in order to solve the defects described above are devices which make it possible to input contents handwritten directly on a screen surface of a display device into an information processing device and which are small-sized and can be produced at a low cost. In order to materialize the above devices, paper which transmits light in a visible region and on which dot patterns are printed can be used as paper which is a means to be written thereon in the former write type input devices, and it is suitably set on a front side or a front face of a display device.

A transparent sheet satisfying the above requirement includes a sheet disclosed in, for example, a patent document 1, which is mounted on a front face or a front side of a display device and on which marks comprising dot patterns capable of providing position informations for showing the positions of input lines by an electronic pen for input and the like are printed by using an ink emitting light capable of being read by the above input line read means by irradiating with light having a prescribed wavelength. However, the kind of an ink which embodies the above transparent sheet is not described in the patent document 1, and only an idea or a desire of the sheet is described therein. Thus, the examples of the specific sheet are not shown therein.

Further, the transparent sheet described above requires the troublesome work that it is cut into a monitor size by a user and stuck so that it is not oblique, and desired is a system in which such work as described above is not required and in which data can be input by handwriting directly on a monitor screen.

Patent document 1: Japanese Patent Application Laid-Open No. 256137/2003

SUMMARY OF THE INVENTION

The present invention has been made in order to solve the problems described above, and an object of the present invention is to provide a sheet which can suitably be used for providing additional informations to an image display medium in such a manner that data are input by handwriting directly on a display device and in which the function described above is built-in from the beginning without making it necessary for the user to stick later a sheet having the above function.

Intensive researches repeated by the present inventors in order to achieve the object described above have resulted in finding that the problem described above can be solved by using as a surface film for a polarizing plate, a film in which transparent patterns having a non-visible light reflective regularity are printed on a surface of a substrate and in which a reflection preventive layer or an antiglare layer is formed thereon or on a back side thereof. The present invention has been completed based on the above knowledge.

That is, the present invention provides:
(1) a surface film for a polarizing plate in which transparent patterns having a non-visible light reflective regularity are printed on a surface of a substrate and in which a reflection preventive layer or an antiglare layer is formed thereon, wherein an ink constituting the above transparent patterns contains a material reflecting a non-visible light,
(2) a surface film for a polarizing plate in which transparent patterns having a non-visible light reflective regularity are printed on a surface of a substrate and in which a reflection preventive layer or an antiglare layer is formed on a back side thereof, wherein an ink constituting the above transparent patterns contains a material reflecting a non-visible light and
(3) a polarizing plate prepared by using the surface film for a polarizing plate described above.

The surface film of the present invention for a polarizing plate can suitably be used for providing additional informations to an image display medium in such a manner that a position coordinate of handwritten informations is input as data by handwriting directly on a display device, and in addition thereto, it does not prevent a visibility of the image display medium. Further, the polarizing plate of the present invention prepared by using the above surface film for a polarizing plate is built in a display device, and therefore the work that a transparent sheet for providing such a function as described above is stuck later by the user is not required.

EXPLANATIONS OF THE CODES

Figure 1:
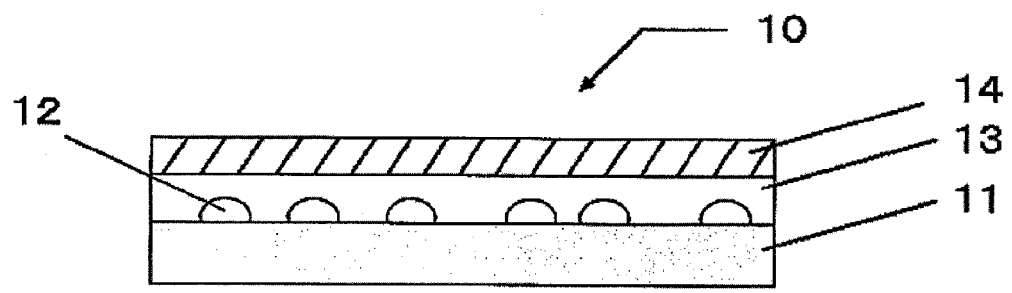
FIG. 1 is a cross section showing the constitution of the surface film of the present invention for a polarizing plate.

10: Surface film for a polarizing plate
11: Substrate
12: Transparent patterns
13: Clearing layer
14: Reflection preventive layer or antiglare layer
20: Polarizing plate
21: Protective layer
22: Polarizer
23: Adhesive layer
31: Input terminal (pen type)
32: Read data processing device
33: Cord
34: Display device
i: Non-visible light (incident light)
r: Reflected light

BEST MODE FOR CARRYING OUT THE INVENTION

The surface film of the present invention for a polarizing plate shall be explained with reference to FIG. 1 to FIG. 4.

The first embodiment of the surface film of the present invention for a polarizing plate is characterized by that transparent patterns 12 having a non-visible light reflective regularity are printed, as shown in FIG. 1, on a surface of a substrate 11 and that an ink constituting the transparent patterns 12 contains a material reflecting a non-visible light. A clearing layer 13 is formed, if necessary, in almost the same thickness as that of the transparent patterns 12 or a thickness covering the transparent patterns 12, and a reflection preventive layer or an antiglare layer 14 is formed thereon.

Figure 2:
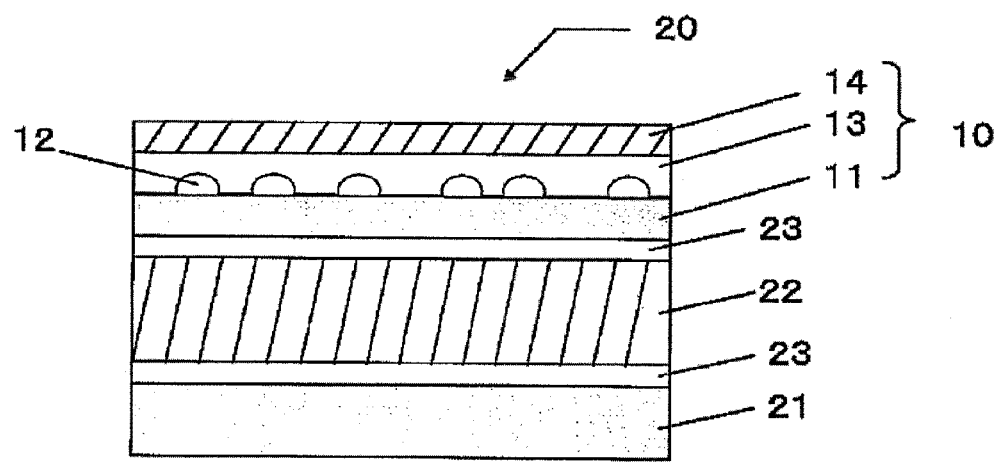
FIG. 2 is a cross section showing the constitution of the polarizing plate of the present invention.

In a polarizing plate prepared by using the surface film 10 for a polarizing plate in the above first embodiment, the surface film 10 for a polarizing plate is built-in as a part of the polarizing plate 20 as shown in FIG. 2, and the reflection preventive layer or antiglare layer 14 is disposed so that it is an outermost layer. To be more specific, protective layers (11 and 21) are stuck usually on both sides of a polarizer 22 via adhesive layers 23 in the polarizing plate, and the substrate 11 of the surface film 10 for a polarizing plate doubles as one protective layer. That is, assumed is a constitution in which the surface film 10 of the present invention for a polarizing plate is stuck onto one surface of the polarizer 22 at a substrate side via the adhesive layer 23 and in which the protective layer 21 is stuck onto the other surface thereof via the adhesive layer 23. Assuming the above constitution makes it possible to provide a function in which a position coordinate of handwritten informations can be input as data only by loading the polarizing plate in the same manner as ever in a production step for a liquid crystal display.

The embodiment described above is an embodiment in which the substrate 11 of the surface film 10 for a polarizing plate doubles as the protective layer for the polarizer 22, and an embodiment in which the protective layers are formed in advance on both sides of the polarizer 22 via the adhesive layers 23 and in which the surface film 10 of the present invention for a polarizing plate is stuck on the other protective layer with an adhesive or the like is included as well in the above first embodiment.

Figure 3:
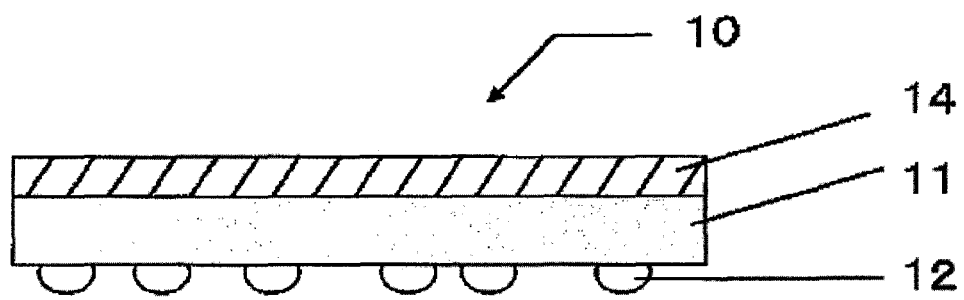
FIG. 3 is a cross section showing the constitution of the surface film of the present invention for a polarizing plate.

Next, in the second embodiment of the surface film of the present invention for a polarizing plate, the transparent patterns 12 having a non-visible light reflective regularity are printed, as shown in FIG. 3, on the surface of the substrate 11 (a lower side of the substrate 11 in FIG. 3), and the reflection preventive layer or antiglare layer 14 is formed on a back side (a face at a reverse side of the transparent patterns 12; an upper side of the substrate 11 in FIG. 3) of the substrate 11.

Figure 4:
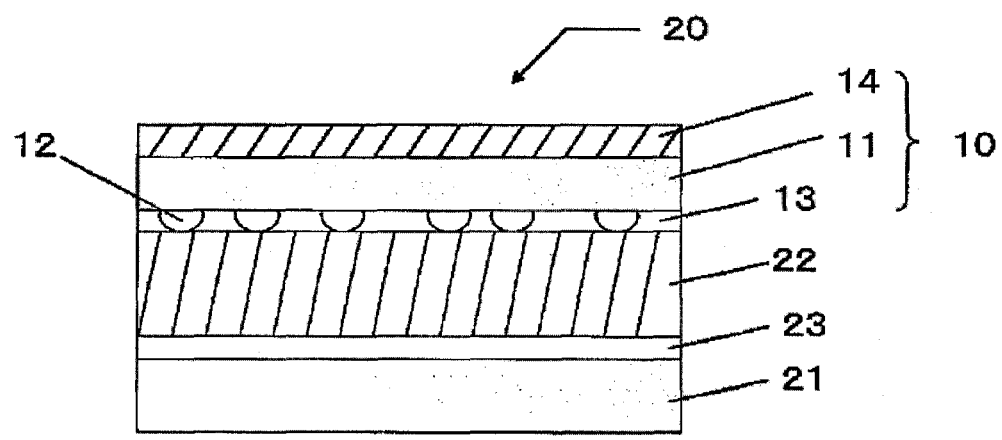
FIG. 4 is a cross section showing the constitution of the polarizing plate of the present invention.

In a polarizing plate prepared by using the surface film 10 for a polarizing plate in the above second embodiment, the surface film 10 for a polarizing plate is built-in as a part of the polarizing plate 20 as shown in FIG. 4, and the reflection preventive layer or antiglare layer 14 is disposed so that it is an outermost layer. To be more specific, the transparent patterns 12 of the surface film for a polarizing plate are disposed so that the transparent patterns are disposed oppositely to the polarizer 22, and the polarizer 22 is stuck onto the surface film 10 for a polarizing plate via the adhesive layer (not illustrated). In the above second embodiment, a clearing layer 13 may be formed in almost the same thickness as that of the transparent patterns 12 or a thickness covering the transparent patterns 12, and the above clearing layer 13 may double as the adhesive layer for adhering the polarizer 22 and the substrate 11. Further, an adhesive layer may be disposed (not illustrated) in place of the clearing layer 13 to adhere the polarizer 22 and the substrate 11.

The respective constitutional elements for constituting the surface film 10 of the present invention for a polarizing plate and the polarizing plate 20 of the present invention shall be explained below in details.

The surface film 10 of the present invention for a polarizing plate is characterized by that the transparent patterns 12 having a non-visible light reflective regularity are printed on the surface of the substrate 11 and that an ink constituting the transparent patterns 12 contains a material reflecting a non-visible light.

The substrate used above is used as a part of the polarizing plate as described above and therefore is preferably transparent, and considering that it is provided in combination with a role as a protective layer for the polarizer 22, it is preferably one selected from triacetyl cellulose (hereinafter referred to as TAC), a cycloolefin polymer (hereinafter referred to as COP) and polycarbonate (hereinafter referred to as PC).

When a polymer film such as a TAC film and the like is used as the substrate described above, the above film is liable to be dissolved or swollen in a solvent in a certain case, and in such case, a barrier layer is preferably provided on the substrate so that the substrate is not damaged by a solvent contained in a coating liquid used in printing the transparent patterns. Also, when a liquid crystal material described later in details is used as a non-visible light reflective material, the above barrier layer may double as an orienting film, and a water-soluble material such as, for example, PVA (polyvinyl alcohol), HEC (hydroxyethyl cellulose) and the like can be used for the barrier layer.

The TAC film described above is known as a protective film for a polarizer, and particularly a polarizing plate prepared by using polyvinyl alcohol (hereinafter referred to as PVA)-iodine as a polarizer and using a TAC film as a protective film has excellent optical characteristics and shows a high polarization rate in a broad frequency range. In addition thereto, it is excellent as well in a brightness and a contrast.

COP is a polymer resin having an alicyclic structure, and it is a resin obtained by polymerizing or copolymerizing cycloolefins. The cycloolefin includes unsaturated hydrocarbons having a polycyclic structure, such as norbornene, dicyclopentadiene, tetracyclododecene, ethyltetracyclododecene, ethylidenetetracyclododecene, tetracyclo[7.4.0.110,13.02,7]trideca-2,4,6,11-tetraene and the like and derivatives thereof; unsaturated hydrocarbons having a monocyclic structure, such as cyclobutene, cyclopentene, cyclohexene, 3,4-dimethylcyclopentene, 3-methylcyclohexene, 2-2-methylbutyl)-1-cyclohexene, cyclooctene, 3a,5,6,7a-tetrahydro-4,7-methano-1H-indene, cycloheptene, cyclopentadiene, cyclohexadiene and the like and derivatives thereof. The above cycloolefins may have polar groups as substituents. The polar group includes a hydroxyl group, a carboxyl group, an alkoxyl group, an epoxy group, a glycidyl group, an oxycarbonyl group, a carbonyl group, an amino group, an ester group, a carboxylic anhydride group and the like. In particular, an ester group, a carboxyl group or a carboxylic anhydride group is suited.

Monomers copolymerizable with the cycloolefins include ethylene; α-olefins such as propylene, 1-butene, 1-pentene and the like; dienes such as 1,4-hexadiene, 4-methyl-1,4-hexadiene, 5-methyl-1,4-hexadiene, 1,7-octadiene and the like.

COP may be one obtained by converting an unsaturated bond in a molecule to a saturated bond by hydrogenation.

PC used as the substrate for the surface film of the present invention includes resin compositions of PC and other resins in addition to conventional PC comprising bisphenol A as a skeleton.

The protective layer 21 in the polarizing plate 20 of the present invention is prepared preferably as well by using a material selected from TAC, COP and PC as is the case with the substrate 11. The protective layer 21 and the substrate 11 may comprise the same material or different materials.

A thickness of the substrate 11 falls preferably in a range of 180 to 400 μm. If a thickness of the substrate is 180 μm or more, the substrate can fulfill a satisfactory protective function for the polarizer when the above substrate doubles as a protective layer for the polarizer. On the other hand, if it is 400 μm or less, the polarizing plate can be reduced in a thickness, and therefore it is preferred.

The substrate 11 can be subjected on one surface or both surfaces, if desired, to surface treatment by an oxidation method, an irregularity method and the like for the purpose of enhancing a close adhesiveness with layers provided on a surface thereof. The oxidation method described above includes, for example, corona discharge treatment, plasma discharge treatment, chromic acid treatment (wet), flame treatment, hot air treatment, ozone•UV ray irradiation treatment and the like. The irregularity method includes, for example, a sand blast method, a solvent treating method and the like. The above surface treating methods are suitably selected according to the kind of the materials, and in general, the corona discharge treating method is preferably used in terms of an effect and an operability. Further, the substrate subjected on one surface or both surfaces to primer treatment can be used as well.

In the present invention, an ink constituting the transparent patterns 12 having a non-visible light reflective regularity is characterized by containing a material reflecting a non-visible light. The non-visible light is preferably an infrared ray or a UV ray. The infrared ray is preferably a ray in a near infrared region of 800 to 2500 nm, and it is more preferably an infrared ray having a selective reflection peak wavelength in 800 to 950 nm. The UV ray is preferably a UV ray having a selective reflection peak wavelength in 200 to 400 nm.

Figure 5:
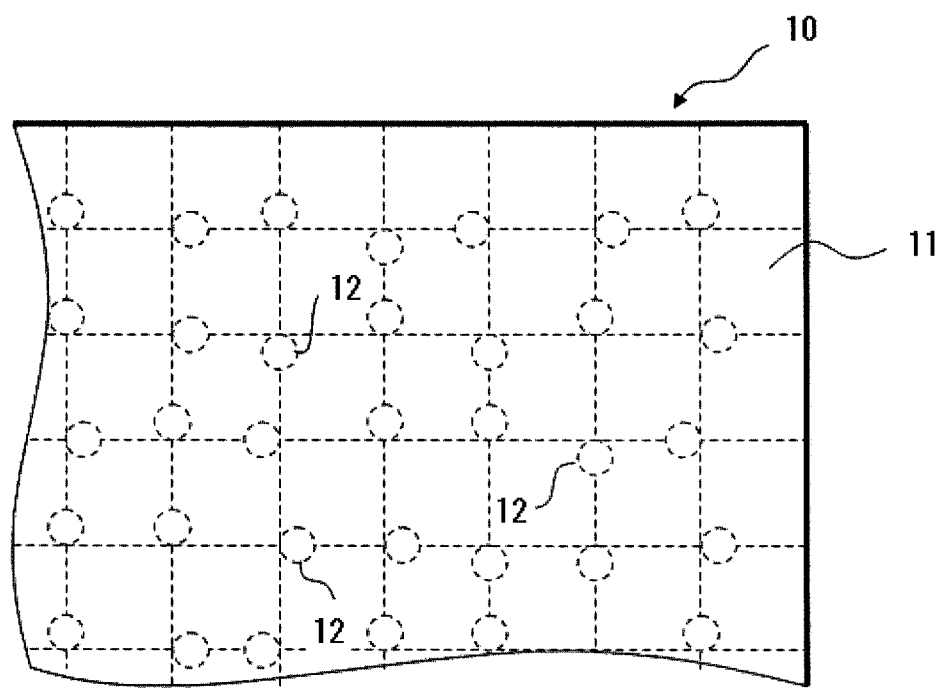
FIG. 5 is an essential part expansion plain view showing a disposing example of dot patterns in the surface film of the present invention for a polarizing plate.

In the present invention, the term "the transparent patterns have a regularity" means that they have a regularity to such an extent that they have a function in which position informations can be provided by reflection of a non-visible light. For example, even patterns which are irregularly disposed, as shown in FIG. 5, at first glance are included in the transparent patterns having a regularity if they have the above function.

The material reflecting a non-visible light (non-visible light reflective material) in the transparent patterns 12 which can be used in the surface film 10 of the present invention for a polarizing plate shall not specifically be restricted as long as it is transparent (an average transmittance is 60% or more, preferably 80% or more in a wavelength of 380 to 780 nm) in a visible region and has a non-visible light reflection function. For example, liquid crystal materials having a cholesteric structure and non-visible light reflective pigments are preferred.

The liquid crystal material displaying a cholesteric structure which can be applied to the surface film 10 of the present invention for a polarizing plate shall be explained below.

The liquid crystal material described above is a liquid crystal material showing a cholesteric liquid crystal phase and shall not specifically be restricted as long as it has a fixed cholesteric structure having a wavelength selection reflectivity to a wavelength in a non-visible light region, particularly a wavelength in an infrared ray region and has a cholesteric regularity, and a chiral nematic liquid crystal material (a polymerizable monomer or a polymerizable oligomer) prepared by mixing a polymerizable nematic liquid crystal with a polymerizable chiral agent or a high molecular cholesteric liquid crystal can be used.

In the present invention, among the polymerizable liquid crystal materials described above, the polymerizable monomers or the polymerizable oligomers each having an acrylate structure as a polymerizable functional group are preferably used.

Liquid crystals are referred to as fluid liquid matters having an optical anisotropy in terms of a narrow sense, but liquid crystals referred to in the present invention include, in addition to the above liquid matters, materials obtained by fixing the above liquid crystals of a narrow sense by polymerizing, cooling and the like while maintaining an optical anisotropy.

In the case of the liquid crystal materials showing (developing) the cholesteric structure described above, essentially a high transmittance is not necessarily required in a wavelength of a visible light region as long as they have a high reflectance (usually about 5 to 50%) in at least a part of a wavelength of a non-visible light region. This is because assuming that the polymerizable liquid crystal materials having the cholesteric structure described above are completely opaque, a desired transparency can be obtained in the whole part of the transparent patterns concerned if an area of a non-forming part (margin part) in the above liquid crystal materials is taken to a suitably large extent to make use of a light transmitting through the above part. However, it is a matter of course that a visible light transmittance of the above liquid crystal materials themselves is preferably higher. Usually, if a high reflection wavelength area of the above polymerizable liquid crystal materials showing a cholesteric structure is shifted to a non-visible light region, a visible light transmittance of about 70% or more is obtained in a thickness of about several μm in a visible light region. On the other hand, a high reflectance of about 5 to 50% is usually obtained in a non-visible light region.

Also, a temperature range in which the polymerizable liquid crystal materials described above show a cholesteric structure shall not specifically be restricted, and it can preferably be fixed in the state of a cholesteric phase. The materials in which a temperature allowing the materials to show a cholesteric phase falls in a range of 30 to 140° C. are preferred since a drying step in printing the patterns and a phase transition of the liquid crystal can be carried out at the same time.

Such materials as described above can be optically fixed while allowing liquid crystal molecules to stay in a state of a cholesteric liquid crystal, and the patterns which are easily handled as a sheet and which are stable at ambient temperature can be formed.

Further, capable of being used as well are liquid crystal polymers (high molecular cholesteric liquid crystals) which have a high glass transition temperature and which can be solidified in a glass state at ambient temperature by cooling after heating. The above materials can be optically fixed as well while allowing liquid crystal molecules to stay in a state of a liquid crystal having a cholesteric regularity, and patterns which are easily handled as an optical film and which are stable at ambient temperature can be formed.

Processes for producing films of cholesteric liquid crystals are described as well in Japanese Patent Application Laid-Open No. 5684/2001 and Japanese Patent Application Laid-Open No. 110045/2001.

The nematic liquid crystal molecules (liquid crystalline monomers) which can be used in the present invention include, for example, compounds represented by Formulas (1) to (11) shown below. The compounds shown below as examples have an acrylate structure and can be polymerized by irradiating with a UV ray and the like.

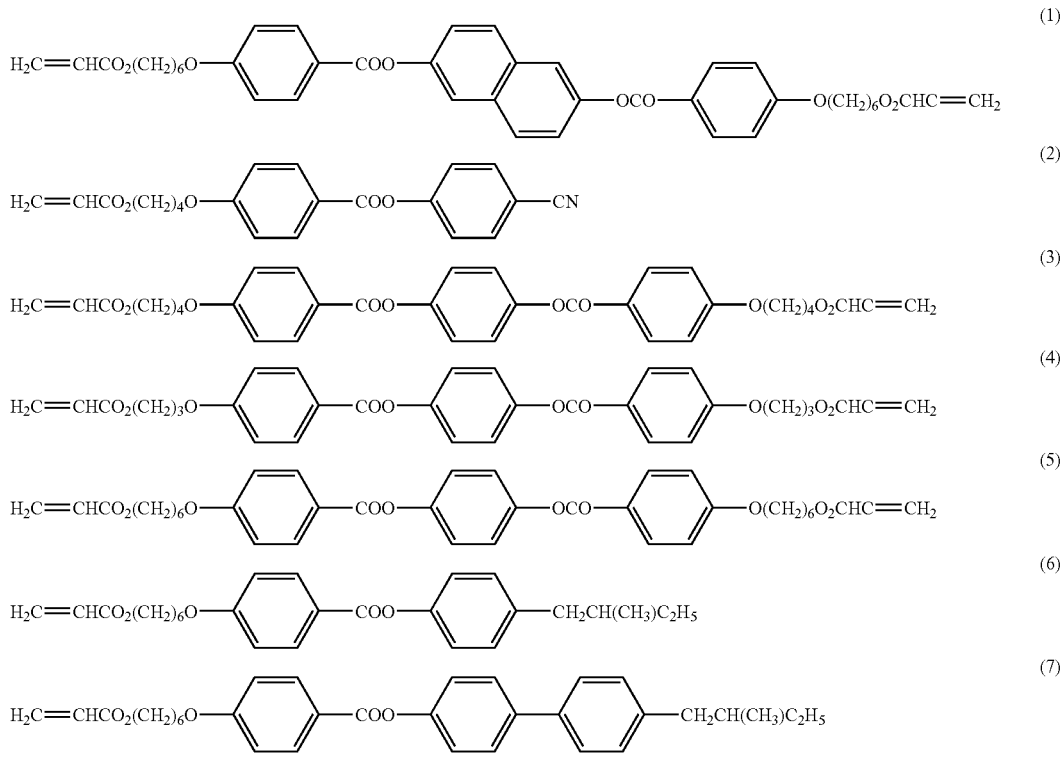

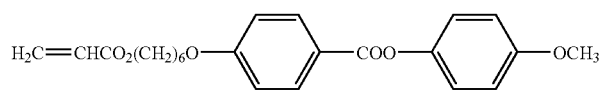
(8)

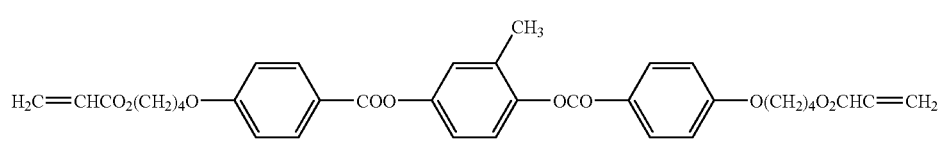
(9)

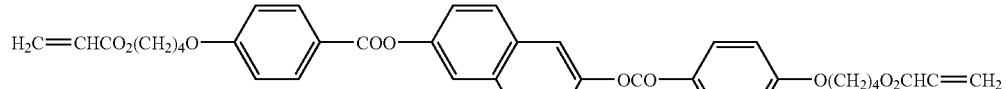
(10)

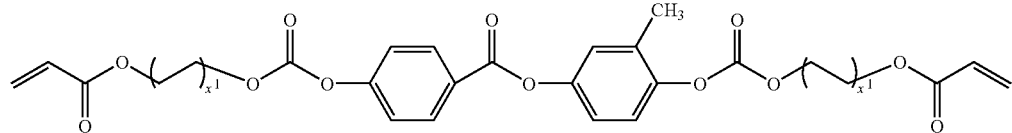
(11)

(in Compound (11), $X^1$ is 2 to 5 (integer)).

Further, high polymers which assume a liquid crystal and in which a mesogen group is introduced into a position of a principal chain or a side chain or both positions of a principal chain and a side chain, high molecular cholesteric liquid crystals in which a cholesteryl group is introduced into a side chain, liquid crystalline high polymers disclosed in Japanese Patent Application Laid-Open No. 133810/1997 and liquid crystalline high polymers disclosed in Japanese Patent Application Laid-Open No. 293252/1999 can be used as the liquid crystal polymers described above.

The chiral agent described above is a material which has an asymmetric carbon atom and which forms a chiral nematic phase by mixing with a nematic liquid crystal, and it shall not specifically be restricted as long as it has a polymerizability. A material having an acrylate structure represented by Formula (12) is preferred since it is polymerizable by irradiation with a UV ray.

selective reflection peak wavelength in an infrared region is varied depending on the kinds of the liquid crystal used and the chiral agent, and when using, for example, the liquid crystal represented by Formula (II) and the chiral agent represented by Formula (12), a cholesteric phase having a reflection peak in an infrared region is formed by adding about 3 parts by weight of the chiral agent per 100 parts by weight of the liquid crystal. When a high molecular cholesteric liquid crystal is used for the liquid crystal material, a polymer material having the targeted pitch length is suitably selected.

The polymer of the nematic liquid crystal molecules and the chiral agent each described above can be obtained, for example, by adding a publicly known photopolymerization initiator and the like to a polymerizable nematic liquid crystal and a polymerizable chiral agent and irradiating the mixture with a UV ray to radically polymerize them.

Also, when printing the transparent patterns by the liquid crystal material described above in the present invention, a

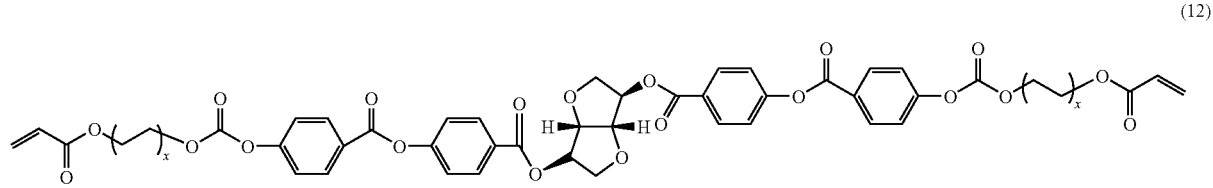
(12)

(X is 2 to 5 (integer)).

When a liquid crystal material having a cholesteric structure is used as a material for the transparent patterns in the present invention, the property of reflecting a non-visible light by the transparent patterns makes use of a wavelength selection reflectivity (the same principle as Bragg reflection in X-ray diffraction) of a cholesteric structure. The selective reflection peak wavelength thereof (wavelength satisfying the Bragg reflection conditions) is determined by a pitch length of a cholesteric structure contained in the patterns, and when the nematic liquid crystal and the chiral agent are used as the liquid crystal material, the pitch length can be controlled by controlling an addition amount of the chiral agent. An addition amount of the chiral agent for obtaining the targeted coating liquid prepared by dissolving the polymerizable monomer or the polymerizable oligomer and the chiral agent in a solvent is preferably used.

The above solvent shall not specifically be restricted as long as it has a satisfactory solubility to the materials, and publicly known compounds are suitably used. It includes, for example, conventional solvents such as anone (cyclohexanone), cyclopentanone, toluene, acetone, MEK (methyl ethyl ketone), MIBK (methyl isobutyl ketone), DMF (N,N-dimethylformamide), DMA (N,N-dimethylacetamide), methyl acetate, ethyl acetate, n-butyl acetate, 3-methoxybutyl acetate and the like and mixed solvents thereof.

Next, a non-visible light reflective pigment which can be applied to the surface film 10 of the present invention for a polarizing plate shall be explained below. The above non-visible light reflective pigment includes, for example, infrared ray reflecting pigments and UV ray reflecting pigments.

The infrared ray reflecting pigment described above is a (color) pigment showing reflection in a near infrared region, and it is a near infrared ray reflecting color pigment having an integral reflectance of 50% or more in a wavelength region of 780 to 2100 nm in terms of a solar radiation reflectance calculated from a spectroscopic reflectance (R$\lambda$i) prescribed in a building heat ray shielding and glass antiscattering film defined according to JIS A5759. It is largely classified into an inorganic infrared ray reflecting pigment and an organic infrared ray reflecting pigment.

Publicly known materials can be used for the inorganic infrared ray reflecting pigment as long as they show a desired reflectance in an intended wavelength, and preferably used are, for example, white pigments and metal powder pigments showing a heat ray reflecting performance and having a high reflectance of a solar light, to be specific, inorganic powders of composite metal oxides such as titanium oxide ($TiO_2$), zinc oxide, zinc sulfide, white lead, antimony oxide, zirconium oxide, tin oxide, tin-doped indium oxide (ITO), tin-doped antimony oxide and the like and metal powders of aluminum, gold, copper and the like. Further, calcium carbonate, barium sulfate, silica, alumina ($Al_2O_3$), clay, talc and the like can be used as well.

Further, inorganic powders of antimony trioxide, antimony dichromate, $SiO_2$ (quartz), $Al_2O_3$ (alumina), $MgO$—$Al_2O_3$—$SiO_2$ (cordierite), $Ca_2P_2O_7$ (apatite), $MnO_2$, $Fe_2O_3$, $ZrO_2$, $ZrSiO_4$ (zircon), $FeTiO_3$ (ilmenite), $Cr_2O_3$, $FeCr_2O_4$ (chromite), $V_2O_5$, $Bi_2O_3$, $MoO_3$, $SnO_2$, $ZnO$, $ThO_2$, $La_2O_3$, $CeO_2$, $Pr_6O_{11}$, $Nd_2O_3$, $Y_2O_3$ and the like which have infrared ray and far infrared ray reflecting performances and a heat ray reflecting performance are preferably used when they show a desired reflectance in an intended wavelength.

In addition thereto, capable of being used are interference pigments comprising transparent supporting materials such as natural or synthetic mica, another foliated silicate, glass flakes, flaky silicon dioxide or aluminum oxide and the like and coatings of metal oxides, which are described in Japanese Patent Application Laid-Open No. 4840/2004.

When they are actually used by adding to an ink used for the transparent patterns, they are used in the form of composite metal oxides comprising plural kinds of the components described above. The specific examples of pigments which are commercially available as the above the inorganic infrared ray reflecting pigments include, for example, Yellow 10401, Yellow 10408, Brown 10348, Green 10405, Blue 10336, Brown 10364 and Brown 10363 (all trade names, manufactured by CERDEC Co., Ltd.), AB820 Black, AG235 Black, AY 150 Yellow, AY 610 Yellow, AR100 Brown, AR300 Brown, AA200 Blue, AA500 Blue and AM110 Green (all trade names, manufactured by Kawamura Chemical Co., Ltd.), Pigment Black 28 ($CuCr_2O_4$), Pigment Black 27 {(Co, Fe) (Fe, $Cr)_2O_4$} and Pigment Green 17 ($Cr_2O_3$) (all trade names, manufactured by Tokan Co., Ltd.), and among them, the pigments showing a desired reflectance in an intended wavelength are preferably used.

Among them, AB820 Black, AG235 Black, Pigment Black 28 and Pigment Black 27 are particularly preferred.

Publicly known materials can be used for the organic infrared ray reflecting pigment as long as they show a desired reflectance in an intended wavelength, and they include, for example, pigments described in Japanese Patent Application Laid-Open No. 330466/2005 and Japanese Patent Application Laid-Open No. 249676/2002, and among them, preferably included are organic pigments of an azo base, an anthraquinone base, a phthalocyanine base, a perinone.perylene base, an indigo.thioindigo base, a dioxiazine base, a quinacridone base, an isoindolinone base, a diketopyrrolopyrrole base, an azomethine base and an azomethineazo base.

When they are actually used by adding to the ink described above, the specific examples of the commercially available pigments include, for example, SYMULER FAST YELLOW 4192 (benzimidazolone), FASTONGN SUPER RED 500RG (quinacridone), FASTONGN SUPER RED ATY (diaminoanthraquinonyl), FASTONGN SUPER VIOLET RVS (dioxazine), FASTONGN SUPER MAGENTA R (quinacridone), FASTONGN SUPER BLUE 6070S (indanthrone), FASTONGN BLUE RSK (phthalocyanine $\alpha$), FASTONGN BLUE 5380 (phthalocyanine $\beta$) and FASTONGN GREEN MY (halogenated phthalocyanine) (all trade names, manufactured by DIC Corporation), and among them, the pigments showing a desired reflectance in an intended wavelength are preferably used.

Among them, phthalocyanine $\alpha$, phthalocyanine $\beta$ and halogenated phthalocyanine are particularly preferred.

A large part of the infrared ray reflecting pigments described above is colored matters, and therefore when such defects that a visibility of a display is damaged are anticipated, a transparency of the patterns is improved by using ultrafine particles having a particle diameter of not larger than a wavelength of a visible light, preferably 100 nm or less.

When the infrared ray reflecting pigments described above are used to prepare an ink, a dispersant may be used in order to enhance a dispersibility of the pigments described above. The dispersant shall not specifically be restricted in a kind, and publicly known dispersants can be used. The specific examples of commercially available dispersants include, for example, Disper BYK 183, 110, 111, 116, 140, 161, 163, 164, 170, 171, 174, 180, 182, 2000, 2001 and 2020 (trade names, manufactured by BYK Chemie AG.).

An amount of the dispersant is preferably 1 to 50 mass parts per 100 mass parts of the pigment described above.

When printed with an ink prepared by using the infrared ray reflecting pigment described above, a coating liquid prepared by dispersing the infrared ray reflecting pigment described above in a solvent is preferably used.

The above solvent shall not specifically be restricted, and publicly known solvents can be used and include, for example, alcohols such as methanol, ethanol, propanol, isopropanol, n-butanol, 2-butanol, isobutanol, tert-butanol and the like, alkoxyalcohols such as 2-ethoxyethanol, 2-botoxyethanol, 3-methoxypropanol, 1-methoxy-2-propanol, 1-ethoxy-2-propanol and the like, ketols such as diacetone alcohol, ketones such as acetone, methyl ethyl ketone, methyl isobutyl ketone and the like, aromatic hydrocarbons such as toluene, xylene and the like and esters such as ethyl acetate, butyl acetate and the like.

A concentration of the infrared ray reflecting pigment described above is preferably 5 to 60 mass % based on the whole amount of the transparent ink. Considering an addition amount of the dispersant, an amount of the infrared ray reflecting pigment is 30 to 85 mass parts, preferably 40 to 80 mass parts and more preferably 50 to 70 mass parts per 100 mass parts of the solid matters contained in the coating liquid described above.

Next, the UV ray reflecting pigment includes oxides of titanium, zirconium, zinc, indium, tin and the like, sulfides of zinc and nitrides of silicon, boron and the like.

In the surface film 10 of the present invention for a polarizing plate, a printing method of the transparent patterns shall not specifically be restricted, and publicly known methods can be used and include, for example, a flexographic printing method, a gravure printing method, a stencil printing method, an ink jet printing method and the like.

In the surface film 10 of the present invention for a polarizing plate, when a liquid crystal material is used, though not necessarily needed, for the transparent patterns, an orientation film is preferably provided between the substrate and the transparent patterns in order to stabilize orientation of the liquid crystal. The material of the orientation film shall not specifically be restricted, and capable of being used are, for example, publicly known material for an orientation film, such as PI (polyimide), PVA, HEC, PC (polycarbonate), PS (polystyrene), PMMA (polymethyl methacrylate), PE (polyester), PVCi (polyvinyl cinnamate), PVK (polyvinyl carbazole), polysilane containing cinnamoyl, coumarin, chalcone and the like. The orientation film formed by using the above materials may be subjected to rubbing treatment and the like. Further, a stretched resin sheet may be adhered on the substrate as the orientation film.

Further, when a cross section obtained by cutting the transparent patterns 12 along a face orthogonal to the substrate 11 is observed under a scanning electron microscope, the transparent patterns 12 assume preferably a multilayer structure (also referred to as a multilayer film structure) comprising a fixed repeating cycle in order to secure a non-visible light reflectivity.

Further, a material repelling the ink forming the transparent patterns 12 can be provided as a base layer between the substrate and the transparent patterns in the surface film of the present invention for a polarizing plate. The above base layer repels the respective droplets of the ink in printing dots forming the transparent patterns 12. The above droplets are repelled to result in rising and curving to a large extent. These curvatures are fixed by drying and cross-linking the droplets, and the transparent patterns 12 result in assuming a multilayer structure comprising a curved part. The formation of the above curved part makes it possible to obtain a non-visible light reflecting film having a broad read angle.

A thickness of the base layer is usually 0.1 to 10 μm, and it is preferably 0.1 to 5 μm from the viewpoint that a thin film can be formed at a low cost.

Materials having the property that they repel droplets of the ink constituting the transparent patterns are selected as the material used for the base composition constituting the base layer. Also, transparent resins comprising organic resins, inorganic resins and the like are preferred particularly in terms of capable of forming a layer by coating. The resins used for the above base composition shall not specifically be restricted and include, for example, thermoplastic resins, thermosetting resins, ionizing radiation-curing resins and the like. Among them, resins of a type in which curing is carried out by cross-linking are preferred from the viewpoint of obtaining a durability, a solvent resistance and a broad read angle, and the ionizing radiation-curing resins which can be cross-linked for short time by an ionizing radiation such as a UV ray, an electron beam and the like are more preferred. When the above resins themselves do not have a satisfactory liquid repellent property to the ink for forming the transparent patterns, a liquid repellent leveling agent may further be added.

The thermoplastic resins described above include, for example, acryl resins, polyester resins, thermoplastic urethane resins, vinyl acetate base resins, cellulose base resins and the like, and when the material for the substrate 11 is TAC, the thermoplastic resin is preferably the cellulose base resin such as nitrocellulose, acetyl cellulose, cellulose acetate propionate, ethyl hydroxyethyl cellulose and the like.

The thermosetting resins described above include, for example, phenol resins, urea resins, diallyl phthalate resins, melamine resins, guanamine resins, unsaturated polyester resins, urethane resins, epoxy resins, aminoalkyd resins, melamine-urea copolycondensation resins, silicone resins, polysiloxane resins, curable acryl resins and the like. When the thermosetting resin is used, a cross-linking agent, a curing agent such as a polymerization initiator and the like, a polymerization accelerating agent, a solvent, a viscosity controlling agent and the like can be further added and used if necessary.

The materials used for the base composition described above are preferably the ionizing radiation-curing resins as described above, and various reactive monomers and/or reactive oligomers are suitably used therefor. The reactive monomers include, for example, multifunctional (meth)acrylate monomers. The reactive oligomers include oligomers having a radically polymerizable unsaturated group in a molecule, for example, the multifunctional (meth)acrylate oligomers described above.

A polymerization initiator for the reactive monomers or the reactive oligomers includes the photopolymerization initiators of the bisacylphosphine oxide base and the α-aminoketone base each described above.

The liquid repellent leveling agent used for the base composition according to the present invention may be any compounds and shall not specifically be restricted as long as they repel the ink forming the transparent patterns 12. Various compounds of a silicone base, a fluorine base, a polyether base, an acrylic acid copolymer base, a titanate base and the like can be used as the kind of the leveling agent. In particular, acrylic acid copolymer base leveling agents (for example, trade name "BYK361", manufactured by BYK Chemie AG.) are preferably used in order to repel the ink of the liquid crystal material forming a fixed cholesteric structure. An addition amount thereof can suitably be controlled according to the desired read angle. When the resin itself selected as a material for the base composition has already a satisfactory liquid repellent property to the ink for forming the transparent patterns, addition of the liquid repellent leveling agent can be omitted. The resins having a high liquid repellent property in itself include silicone resins, fluororesins and the like.

From the viewpoint of obtaining the broad read angle, the leveling agent (liquid repellent substance) described above is added to the base layer described above, and in addition thereto, fine particles may be further added to form irregularities and folds on a Bragg reflection surface formed thereon having a cholesteric structure of liquid crystal.

Conventionally used substances can be added as the fine particles in a suitable amount without specific restrictions, and the fine inorganic particles include, for example, transparent particles of α-alumina, silica, kaolinite, glass, calcium carbonate, diamond, silicon carbide and the like. The form of the particles includes a sphere, a spheroid, a polyhedron, a truncated polyhedron, a scale and the like, and it shall not specifically be restricted but is preferably a sphere. The fine organic particles include synthetic resin beads of a cross-linked acryl resin, a polycarbonate resin and the like. Among them, α-alumina and silica are preferred from the standpoints that they have a high transparency and that spherical particles are liable to be obtained, and the spherical particles thereof are particularly preferred. The fine particles have a particle diameter of 50 μm to 5 mm. The surface of the transparent patterns may be curved to a convex curved face (for example, a hemispherical curved face), and fine irregularities may be provided on the surface of the transparent patterns by embossing.

The base layer described above can be formed by coating the ink of the base composition obtained in the manner described above by a publicly known layer forming method such as a coating method, a printing method and the like. To be specific, it is suitably formed by a coating method such as roll coating, comma coating, die coating and the like or a printing method such as screen printing, gravure printing and the like.

The surface film 10 of the present invention for a polarizing plate is characterized by that a reflection preventive layer or antiglare layer 14 is formed on the transparent patterns 12 described above or a back surface (a surface on which the transparent patterns are not formed) of the substrate 11.

The reflection preventive layer has a function to reduce mirroring on a screen brought about by an outside light coming from a sun and a fluorescent lamp which comes into a display screen of an image display device and is reflected thereon and a function to improve a contrast of an image by controlling a reflectance on a surface to result in enhancing a visibility of the image.

The reflection preventive layer in the present invention has a constitution in which at least one transparent dielectric layer is laminated on the transparent patterns 12 in the first embodiment described above and in which at least one transparent dielectric layer is laminated on a back side of the substrate 11 in the second embodiment. The constitution is assumed so that a reflectance of an outermost layer out of the above dielectric layer is lower than a reflectance of a layer located immediately therebeneath, and an optical thickness (reflectance×geometric thickness) of the above dielectric layer is preferably set to ¼ of a wavelength of a light to be prevented from being reflected. The above constitution makes it possible to reduce lights reflected from the interfaces of the respective layers by interference.

The representative layer constitution of the reflection preventive layer includes (1) a low refractive index layer, (2) a high refractive index layer/a low refractive index layer, (3) a low refractive index layer/a high refractive index layer/a low refractive index layer, (4) a high refractive index layer/a middle refractive index layer/a low refractive index layer and the like on the substrate 11 or the transparent patterns 12.

The materials of the respective layers constituting the reflection preventive layer include inorganic materials such as magnesium fluoride ($MgF_2$), cryolite and the like and low refractive index resin compositions in the case of the low refractive index layer. Capable of being used as the low refractive index resin composition is, for example, a composition prepared by dispersing transparent fine particles having an average particle diameter of 5 to 300 nm in an ionizing radiation-curing resin having a fluorine atom in a molecule. On the other hand, the material of the high refractive index layer includes inorganic materials such as titanium dioxide, zinc sulfide and the like.

Either of a dry process and a wet process can be used as a process for forming the reflection preventive layer. The dry process is a process for forming the respective layers by vacuum vapor deposition, sputtering, ion plating and the like. On the other hand, the wet process is a process in which coating liquids for forming the respective layer are coated by a bar coating method, a knife coating method, a roll coating method, a blade coating method, a die coating method, a gravure coating method and the like and cured by heating to form the respective layers.

The antiglare layer has a function to prevent glaring and flickering feelings on a display screen in an image display device by diffusing (scattering) light by means of fine irregularities on the surface of the layer or fine particles having different refractive indices which are dispersed in an inside of the layer.

The above antiglare layer includes publicly known layers, for example, layers containing inorganic particles, preferably silica particles or layers having a finely irregular surface which reflects diffusely outside lights.

Either of a dry process and a wet process can be used as a process for forming the above antiglare layer. The dry process includes a process in which fine irregularities are formed on the surface by means of hot press using an embossed plate and a process in which fine irregularities are formed on the surface by a sand blast method.

On the other hand, the wet process includes, for example, a process in which a curable composition prepared by dispersing silica particles having an average particle diameter of usually 30 am or less, preferably 2 to 15 µm in an amount of 0.1 to 10 mass parts per 100 mass parts of the resin in a curing type resin such as an acryl resin including polyacrylic ester copolymers obtained from ethyl acrylate, butyl acrylate, 2-ethylhexyl acrylate, t-butyl acrylate and the like, a diene base resin, a polyester base resin, a silicone base resin and the like is coated by gravure coating, reverse roll coating, die coating or the like so that a thickness after drying is 5 to 30 µm and in which it is dried and, if necessary, cured by heating or irradiating with a UV ray or an electron beam.

From the viewpoint of an abrasion resistance, the antiglare layer is preferably formed by coating a coating liquid containing the ionizing radiation-curing type polymerizable compound described above, silica particles and, if desired, a photopolymerization initiator to form a coating film and curing the above coating film by irradiating with an ionizing radiation.

In the surface film 10 of the present invention for a polarizing plate, a clearing layer 13 is preferably formed between the substrate 11 and the reflection preventive layer or antiglare layer 14 in almost the same thickness as that of the transparent patterns 12 or a thickness covering the transparent patterns 12.

When the clearing layer 13 is formed on the substrate 11 in almost the same thickness as that of the transparent patterns 12, (a thickness of the transparent patterns 12)−(a thickness of the clearing layer 13) is preferably 0.15 µm or less, and spaces between the transparent patterns are preferably buried. Further, when the clearing layer 13 is formed in a thickness covering the transparent patterns 12, an irregular step on the surface of the clearing layer 13 has preferably a flatness of about 15 µm or less.

Moirés (stripes) can be reduced in the manner described above. Moirés show stripe patterns visually produced by deviation in a period of repetitive patterns having a regularity to a certain extent when a plurality thereof is superposed. An image display device such as LCD displays images by arrangement of fine light emitting dots, and in such case, moirés are produced by interference of arrangement of light emitting dots on a display with the dot patterns described above.

The material of the clearing layer 13 shall not specifically be restricted, and various transparent materials such as resins, metal oxides, glass and the like can be used. In particular, it is preferably a transparent resin layer comprising an organic resin or an inorganic resin from the viewpoint that the layer can be formed by coating. Further, the clearing layer may have together at least one function of a hard coat layer, a pressure-sensitive adhesive layer, an adhesive layer, a shock absorbing layer, various filter layers and the like in addition to a clearing function.

In particular, in the case of the first embodiment described above (refer to FIG. 1 and FIG. 2), the clearing layer is close to an outermost layer, and therefore it has preferably a function as a hard coat layer. In the case of the second embodiment described above (refer to FIG. 3 and FIG. 4), the clearing layer has preferably a function as a pressure-sensitive adhesive layer or an adhesive layer considering an adhesive property with the polarizer 22.

A resin used for the clearing layer 13 shall not specifically be restricted as long as it is a transparent resin in which a difference in a refractive index from those of the dot patterns is sufficiently small as described later and in which a reflectance of an infrared ray used for reading is sufficiently low as compared with those of the dot patterns, and publicly known resins can suitably be employed considering a close adhesiveness with the substrate 11 and the ink forming the transparent patterns 12. To be specific, it includes thermoplastic resins, thermosetting resins, ionizing radiation-curing resins and the like. Among them, the resins of a type in which curing is carried out by cross-linking are preferred from the viewpoints of a durability, a solvent resistance and the like, and the ionizing radiation-curing resins which can be cross-linked in a short time by an ionizing radiation are preferred. The above ionizing radiation-curing resins are advantageous from the viewpoint that they readily bury irregularities produced by the transparent patterns since they can be coated in the absence of a solvent or a state close to the absence of a solvent.

The thermoplastic resins described above include, for example, acryl resins, polyester resins, thermoplastic urethane resins, vinyl acetate resins, cellulose base resins and the like, and when the material for the substrate 11 is TAC, the thermoplastic resin is preferably the cellulose base resin such as nitrocellulose, acetyl cellulose, cellulose acetate propionate, ethyl hydroxyethyl cellulose and the like.

The thermosetting resins described above include, for example, phenol resins, urea resins, diallyl phthalate resins, melamine resins, guanamine resins, unsaturated polyester resins, urethane resins, epoxy resins, aminoalkyd resins, melamine-urea copolycondensation resins, silicone resins, polysiloxane resins, curable acryl resins and the like. When the thermosetting resin is used, a cross-linking agent, a curing agent such as a polymerization initiator and the like, a polymerization accelerating agent, a solvent, a viscosity controlling agent and the like can be further added and used if necessary.

The ionizing radiation-curing type resin described above includes reins having functional groups of a (meth)acrylate base which are cured by an ionizing radiation such as a UV ray, an electron beam and the like, for example, oligomers or prepolymers and reactive diluents of (meth)acrylates of multifunctional compounds, such as polyester resins, polyether resins, acryl resins, epoxy resins, urethane resins, alkyd resins, spiroacetal resins, polybutadiene resins, polythiolpolyene resins, polyhydric alcohols and the like each having a relatively low molecular weight. The specific examples thereof include monofunctional monomers such as ethyl (meth)acrylate, ethylhexyl(meth)acrylate, styrene, methylstyrene, N-vinylpyrrolidone and the like and multifunctional monomers, for example, polymethylolpropane tri(meth)acrylate, hexanediol(meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, neopentyl glycol di(meth)acrylate and the like. In this regard, (meth)acrylate is expression which means acrylate or methacrylate.

In addition to the above, resins having a cationically polymerizable functional group, for example, epoxy resins and the like can be used as well.

When the ionizing radiation-curing type resin described above is used as a UV ray-curing type resin, a photopolymerization initiator is preferably used in combination. The specific examples of the photopolymerization initiator include acetophenones, benzophenones, Michler benzoyl benzoate, α-amyloxime ester, tetramethylthiuram monosulfide and thioxanthones. Further, a photosensitizer is preferably used in a mixture, and the specific examples thereof include n-butylamine, triethylamine, tri-n-butylphosphine and the like.

In addition to the resin, publicly known various additives and various pigments in coating liquids and inks may suitably be added, if necessary, to the transparent resin layer. The additives include, for example, light stabilizers such as UV absorbers, dispersion stabilizers and the like, and the pigments include, for example, pigments which are publicly known in filters for displays, such as pigments for preventing outside light reflection.

The clearing layer 13 can be formed by a publicly known layer forming method such as a coating method, a printing method and the like by using a composition containing, in addition to the resin described above, usually a solvent and, if necessary, various additives, a pigment and the like in the form of a coating liquid or an ink. To be specific, it is suitably formed on a printed face of the substrate 11 on which the transparent patterns 12 have already been printed by a coating method such as roll coating, comma coating, die coating and the like or a printing method such as screen printing, gravure printing and the like. It is easy to partially form the clearing layer in an optional shape by the printing method, and it can partially be formed as well by intermittent coating in the coating method.

A thickness of the clearing layer 13 may suitably be determined according to a thickness of the infrared ray reflection patterns 12 and an extent of a transparency required and shall not specifically be restricted. It is usually almost the same thickness as that of the transparent patterns 12 or preferably a thickness covering the transparent patterns 12.

Further, a hard coat layer may be provided between the transparent patterns 12 or the clearing layer 13 and the reflection preventive layer or antiglare layer 14 in the surface film 10 of the present invention for a polarizing plate in order to provide the surface film with a strength which can stand repetitive contact given by an input terminal of a pen type when inputting by handwriting by means of the input terminal. The hard coat layer has together a function of a penetration preventing layer which prevents the ink (coating liquid) forming the reflection preventive layer or antiglare layer from penetrating into the transparent patterns and the substrate. If the above ink penetrates into the substrate and the like, the reflection preventing function and the antiglare function can not be displayed. When the clearing layer, the transparent patterns and the substrate each described above are subjected to treatment for preventing penetration, the hard coat layer having a penetration preventing function is not necessarily required.

The material of the hard coat layer shall not specifically be restricted, and materials used in the fields of usual sheets and lenses can be used. The representative materials thereof include, for example, acryl resins, silicon base resins and the like which are cross-linked and cured by a UV ray, an electron beam, heat and the like.

The surface film 10 of the present invention for a polarizing plate is used as a part of the polarizing plate 20, and it is used for applications in which various informations (position coordinates and the like) involved in the image are provided. Media displaying image informations of various forms are the objects of this image display medium. The image informations displayed may be any forms of still images and moving images. The kinds of the informations are targeted for various ones such as characters, numbers, figures, decryption codes such as bar codes and the like, photographic images (landscapes, persons, pictures and all the rest) and the like. The specific image display medium includes liquid crystal displays prepared by using a polarizing plate, in which the surface film of the present invention is suitably used.

In the surface film 10 of the present invention for a polarizing plate, the transparent patterns are set so that the position informations of an input terminal equipped with a sensor on the film face can be derived from partial patterns read by the input terminal.

The transparent patterns 12 in the present invention include, for example, patterns obtained by setting plural forms of dots and patternizing the combinations of the dots of these plural forms arranged in a prescribed range in a plain face, patterns obtained by changing the thicknesses of ruled lines arranged vertically and horizontally and patternizing the combinations of the sizes of the overlapped parts of the ruled lines described above in a prescribed range and patterns obtained by combining the values of x, y coordinates directly with the vertical and horizontal sizes of dots. A particularly simple and suited method includes a method in which standard points arranged vertically and horizontally are set at equal intervals and in which dots displaced right and left, up and down based on the above standard points are arranged to make use of a relative positional relation of the above dots from the above standard points. The above method is advantageous for raising a resolution of the input device since a size of the dots can be reduced and fixed.

In the surface film of the present invention for a polarizing plate, a larger reflectance of a non-visible light in a wavelength irradiated and detected by a non-visible light sensor installed in the input device is preferred in order to detect reflected patterns by means of the sensor. The reflectance in a wavelength irradiated and detected by the sensor is usually 5 to 50%, preferably 20% or more.

When a liquid crystal material having a cholesteric structure is used as the non-visible light reflective material, reflection by a cholesteric structure has a property to reflect only a circularly polarized light having the same direction as that of a cholesteric spiral, and therefore the reflectance reaches only about 50% at a maximum.

In the case of reflection by a cholesteric structure, usually the larger the printed thickness is, the larger the reflection intensity is, but the too large print thickness brings about a disturbance in an orientation of the liquid crystal, a reduction in the transparency and an increase in the drying load, and therefore a print thickness of the non-visible light reflection patterns is usually 1 to 20 μm, preferably 3 to 10 μm.

When a non-visible light reflective pigment is used as the non-visible light reflective material, a print thickness of the non-visible light reflection patterns is suitably 0.1 μm or more, usually 1 to 20 μm. In general, the larger the film thickness is, the more the reflectance is enhanced, but the larger film thickness increases the color density to damage the transparency, and therefore the film thickness has to be suitably controlled.

In the surface film of the present invention for a polarizing plate, the dot forms of the dot patterns shall not specifically be restricted as long as the dots can readily be distinguished from the adjacent dots, and the forms in which plane-viewing forms are circular, elliptic, polygonal and the like are usually used. The steric forms of the dots shall not specifically be restricted as well, and usually an approximately disc-like form is preferred from the viewpoint that a pen type input terminal brought into contact with the dots slides smoothly thereon without meeting resistance and that the dots and the above terminal are less liable to be damaged with each other. They may be as well a semispherical form, a concave form and a polygonal form.

In this regard, an information processing device handling handwritten informations shall not specifically be restricted as long as a liquid crystal display in which a polarizing plate is loaded is used therefor, and capable of being shown as the examples thereof are portable phones, various mobile terminals such as PDA and the like, personal computers, TV phones, TV endowed with an intercommunication function, internet terminals and the like.

Figure 6:
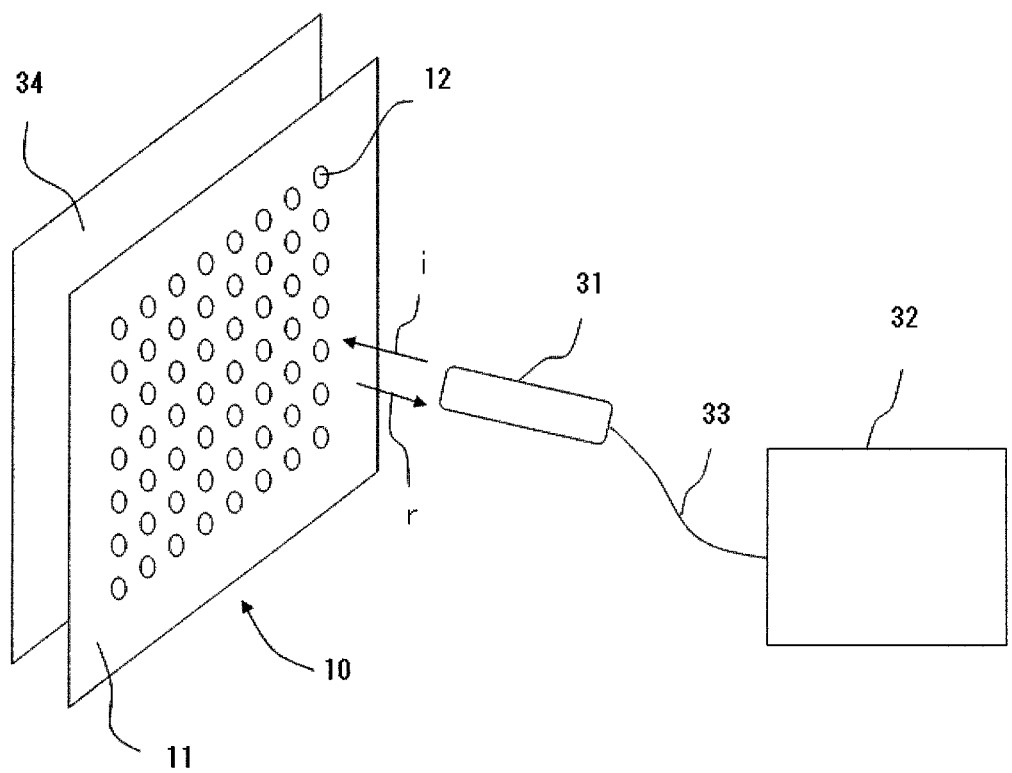
FIG. 6 is a schematic drawing of a system in which the surface film of the present invention for a polarizing plate is used.

An input terminal 31 which can be used in the present invention shall not specifically be restricted as long as it can emit, as shown in FIG. 6, a non-visible light i and detect a reflected ray r of the patterns described above, and a publicly known sensor is suitably used. An example in which the input terminal 31 of a pen type is equipped as well with a read data processing device 32 is disclosed in Japanese Patent Application Laid-Open No. 256137/2003. Further, it includes input terminals in which built-in are a pen tip provided with no ink and no graphite, a CMOS camera equipped with a non-visible light irradiation part, a processor, a memory, a communication interface such as a wireless transceiver and the like making use of a Bluetooth technique, a battery and the like.

To explain the action of the pen type input terminal 31, the pen tip is brought into contact with a front surface of the surface film 10 for a polarizing plate on which the transparent patterns 12 are printed as shown in FIG. 5 by plain viewing and draws lines so that the pen tip traces the front surface, and the pen type input terminal 31 detects a pen pressure applied onto the pen tip to operate the CMOS camera; a prescribed range in the vicinity of the pen tip is irradiated with a non-visible light of a prescribed wavelength emitted from the non-visible light irradiation part, and the patterns are imaged (the patterns are imaged several 10 to about 100 times per second). When the pen type input terminal 31 is equipped with a read data processing device 32, input lines formed by movement of the pen tip in handwriting are digitized and turned into data by analyzing the imaged patterns by means of the processor to prepare an input line data, and the input line data is sent to the information processing device.

The members such as the processor, the memory, the communication interface such as a wireless transceiver and the like making use of a Bluetooth technique, the battery and the like may be present, as shown in FIG. 6, as the read data processing device 32 at an outside of the pen type input terminal 31. In this case, the pen type input terminal 31 may be connected to the read data processing device 32 via a cord 33 or may send read data by wireless using an electric wave, a non-visible light and the like.

In addition thereto, the input terminal 31 may be a reader described in Japanese Patent Application Laid-Open No. 243006/2001.

The read data processing device 32 which can be applied in the present invention shall not specifically be restricted as long as it has a function to calculate a position information from a continuous imaged data read by the input terminal 31 and combine it with a time information to provide it as an input line data which can be handled by the information processing device, and it is suitably equipped with members such as a processor, a memory, a communication interface, a battery and the like.

The read data processing device 32 may be built in the input terminal 31 as described in Japanese Patent Application Laid-Open No. 256137/2003 or may be built in the information processing device equipped with a display device. The read data processing device 32 may send a position information to the information processing device equipped with a display device by wireless or may send it by wire connected thereto via a cord and the like.

EXAMPLES

Next, the present invention shall be explained in further details with reference to examples, but the present invention shall not be restricted to the examples shown below.

Example 1

(1) Preparation of the Respective Coating Liquids (1-1) Preparation of a Coating Liquid for Non-Visible Light (Infrared Ray) Reflecting Transparent Patterns Prepared was an anone solution obtained by dissolving in cyclohexanone, 100 mass parts of a monomer (having a molecular structure represented by the compound (II) described above, average refractive index $n_1=1.56$) which has polymerizable acryloyl groups at both ends, a mesogen structure in a central part and a spacer between the polymerizable acryloyl groups described above and in which a nematic isotropic transition temperature resides in a vicinity of 110° C. and 3 mass parts of a chiral agent (having a molecular structure represented by Formula (12) described above) having polymerizable acryloyl groups at both ends. Added to the above anone solution was 4 mass parts of a photopolymerization initiator (trade name: Lucirin TPO, manufactured by BASF Japan Co., Ltd.).

(1-2) Preparation of a Coating Liquid for an Ink Repellent Base

Added and mixed were 100 mass parts of pentaerythritol triacrylate (PETA, trade name: KAYARAD PET-30, manufactured by Nippon Kayaku Co., Ltd.), 0.06 mass part of a leveling agent (trade name: BYK 361, manufactured by BYK Chemie AG.) and 4 mass parts of a photopolymerization initiator (trade name: Irgacure 184, manufactured by Ciba Specialty Chemicals K.K.). Further, methyl ethyl ketone was suitably added so that the resin content was 50 mass % to prepare a coating liquid for an ink repellent base.

(1-3) Preparation of a Coating Liquid for a Clearing Layer Doubling as a Hard Coat Layer Mixed were 25 mass % of a dispersion (solid-core silica fine particles: 35 mass %) obtained by dispersing solid-core silica fine particles B in which a surface is modified and in which an inside of an outer shell is not hollow in methyl isobutyl ketone, 25 mass % of urethane acrylate (trade name: Shiko UV1700, manufactured by The Nippon Synthetic Chemical Co., Ltd.), 0.2 mass % of a photopolymerization initiator (trade name: Irgacure 184, manufactured by Ciba Specialty Chemicals K.K.) and 49.8 mass % of methyl ethyl ketone as a solvent, and a coating liquid for a clearing layer doubling as a hard coat layer was prepared.

(1-4) Preparation of a Coating Liquid for a Reflection Preventive Layer (Low Refractive Index Layer)

Mixed were 11.6 mass % of a dispersion (containing 20 mass % of hollow silica sol) obtained by dispersing surface-modified hollow silica in methyl isobutyl ketone, 0.7 mass % of a dispersion (containing 20 mass % of solid-core silica fine particles) obtained by dispersing solid-core silica fine particles A in which a surface is modified and in which an inside of an outer shell is not hollow in methyl isobutyl ketone, 9.6 mass % of PETA (trade name: KAYARAD PET-30, containing 10 mass % of PETA, manufactured by Nippon Kayaku Co., Ltd.), 3.2 mass % of dipentaerythritol hexaacrylate (DPHA, manufactured by Nippon Kayaku Co., Ltd., containing 10 mass % of DPHA), 0.06 mass % of a photopolymerization initiator (trade name: Irgacure 127, manufactured by Ciba Specialty Chemicals K.K.), 0.04 mass % of a modified silicone oil (trade name: X-22-164E, manufactured by Shin-Etsu Chemical Co., Ltd.) and 74.8 mass % of methyl isobutyl ketone as a solvent, and a coating liquid for a reflection preventive layer (low refractive index layer) was prepared.

(2) Production of a Surface Film for a Polarizing Plate (2-1) Printing of Dot Patterns The coating liquid for an ink repellent base prepared in (1-2) described above was coated on a triacetyl cellulose (TAC) transparent substrate (trade name: TD-80UL, manufactured by FUJIFILM Corporation) having a thickness of 80 µm in a thickness of 1 µm by means of a bar coater and cured by irradiation with a UV ray (UV ray irradiating device, manufactured by Fusion UV System Japan Co., Ltd.; light source: H valve, irradiation dose: 120 mJ/cm$^2$). Next, the coating liquid for infrared ray reflecting transparent patterns prepared in (1-1) described above was coated in the form of dot patterns on the above substrate in a thickness of 6 to 8 µm by a gravure printing method and cured by irradiation with a UV ray.

(2-2) Formation of a Clearing Layer Doubling as a Hard Coat Layer

The coating liquid for a clearing layer doubling as a hard coat layer prepared in (1-3) described above was coated on the printed dot patterns described above by means of a bar coater and dried, and then it was subjected to curing treatment by irradiating with a UV ray (UV ray irradiating device described above; irradiation dose: 10 mJ/cm$^2$), whereby a clearing layer doubling as a hard coat layer having a film thickness of about 15 µm was prepared.

A hardness on the surface after forming the clearing layer doubling as the hard coat layer was evaluated by measuring a pencil hardness to find that it was 4H. The pencil hardness was evaluated by drawing five lines at a load of 500 g by means of a prescribed pencil and then visually observing the presence of scratches on the hard coat layer.

(2-3) Formation of a Reflection Preventive Layer

Next, the coating liquid for a reflection preventive layer prepared in (1-4) described above was coated on the clearing layer doubling as the hard coat layer by means of a bar coater and dried, and then it was subjected to curing treatment by irradiating with a UV ray (UV ray irradiating device described above; irradiation dose: 200 mJ/cm$^2$), whereby a reflection preventive layer (low refractive index layer) was formed to obtain a surface film for a polarizing plate. A film thickness of the reflection preventive layer (low refractive index layer) was set so that a minimum value of the reflectance when an incident angle and a reflection angle were five degrees respectively, which was measured by means of a spectrophotometer UV-3100PC manufactured by Shimadzu Corporation was about 550 nm.

(3) Production of Polarizing Plate

A TAC film was stuck on one face of a polarizer of a PVA-iodine base via an adhesive, and the surface film for a polarizing plate prepared above was stuck on the other face via the adhesive (the same as described above) so that a TAC substrate side was disposed oppositely to the polarizer as shown in FIG. 2 to produce a polarizing plate.

(4) Evaluation

In the surface film for a polarizing plate described above, the lowest reflectance when an incident angle and a reflection angle were five degrees respectively was measured by means of the spectrophotometer UV-3100PC manufactured by Shimadzu Corporation to result in finding that the lowest reflectance was 1.4%.

INDUSTRIAL APPLICABILITY

The surface film 10 of the present invention for a polarizing plate constitutes a part of a polarizing plate and can provide a function to be capable of inputting a position coordinate of handwritten informations as data only by loading a polarizing plate in the same manner as ever in a production process of a liquid crystal display. Accordingly, particularly the work that a transparent sheet for providing the above function is stuck later by the user is not required, and a liquid crystal display which is provided with the above function from the beginning can be provided.

The liquid crystal display described above has a practical performance and can be applied to various information processing devices including portable phones, various mobile terminals such as PDA and the like, personal computers, TV phones, TV endowed with an intercommunication function, internet terminals and the like.

What is claimed is:

1. A polarizing plate comprising a polyvinyl base polarizer and a surface film including transparent patterns having a non-visible light reflective regularity are printed on a surface of a substrate and in which a reflection preventive layer or an antiglare layer is formed thereon, wherein an ink constituting the above transparent patterns contains a material reflecting a non-visible light, and
wherein a clearing layer is formed in almost the same thickness as that of the transparent patterns or a thickness covering the transparent patterns and
the surface film is stuck on one surface of a polyvinyl alcohol base polarizer and in which a film constituted by a material selected from triacetyl cellulose, a cycloolefin polymer and polycarbonate is stuck on the other surface thereof, wherein the polarizer and the substrate for the surface film for the polarizing plate are stuck via an adhesive layer.

2. The polarizing plate according to claim 1, wherein the substrate is one selected from triacetyl cellulose, a cycloolefin polymer and polycarbonate.

3. The polarizing plate according to claim 1, wherein a thickness of the substrate is 180 to 400 μm.

4. The polarizing plate according to claim 1, wherein the clearing layer is a transparent resin layer in which cross-linking is formed by an ionizing radiation.

5. The polarizing plate according to claim 1, wherein the clearing layer is an adhesive layer or a pressure-sensitive layer.

6. The polarizing plate according to claim 1, wherein the non-visible light is an infrared ray or a UV ray.

7. The polarizing plate according to claim 1, wherein the transparent patterns have a selective reflection peak wavelength in 800 to 950 nm.

8. The polarizing plate according to claim 1, wherein the transparent patterns have a selective reflection peak wavelength in 200 to 400 nm.

9. The polarizing plate according to claim 1, wherein the material reflecting a non-visible light is a liquid crystal material having a fixed cholesteric structure and having a wavelength selection reflectivity to a wavelength in a non-visible light region.

10. The polarizing plate according to claim 1, wherein the material reflecting a non-visible light contains a non-visible light reflective pigment.

11. The polarizing plate according to claim 1, wherein the transparent patterns are dot patterns.

12. The polarizing plate according to claim 1, wherein the surface film for a polarizing plate reads reflected patterns of the surface film by means of an input terminal capable of irradiating with a non-visible light and detecting it to thereby make it possible to provide information regarding a position of the input terminal on the surface film.

13. A polarizing plate comprising a polyvinyl base polarizer and a surface film including transparent patterns having a non-visible light reflective regularity are printed on a surface of a substrate and in which a reflection preventive layer or an antiglare layer is formed on a back side thereof, wherein an ink constituting the above transparent patterns contains a material reflecting a non-visible light,
wherein a clearing layer is formed in almost the same thickness as that of the transparent patterns or a thickness covering the transparent patterns and
the surface film stuck on one surface of the polyvinyl alcohol base polarizer and in which a film constituted by a material selected from triacetyl cellulose, a cycloolefin polymer and polycarbonate is stuck on the other surface thereof, wherein the polarizer and the surface film are stuck so that the polarizer is disposed oppositely to at least one of the transparent patterns and the clearing layer in the surface film for the polarizing plate.

14. The polarizing plate according to claim 13, wherein the substrate is one selected from triacetyl cellulose, a cycloolefin polymer and polycarbonate.

15. The polarizing plate according to claim 13, wherein a thickness of the substrate is 180 to 400 μm.

16. The polarizing plate according to claim 13, wherein the clearing layer is a transparent resin layer in which cross-linking is formed by an ionizing radiation.

17. The polarizing plate according to claim 13, wherein the clearing layer is an adhesive layer or a pressure-sensitive layer.

18. The polarizing plate according to claim 13, wherein the non-visible light is an infrared ray or a UV ray.

19. The polarizing plate according to claim 13, wherein the transparent patterns have a selective reflection peak wavelength in 800 to 950 nm.

20. The polarizing plate according to claim 13, wherein the transparent patterns have a selective reflection peak wavelength in 200 to 400 nm.

21. The polarizing plate according to claim 13, wherein the material reflecting a non-visible light is a liquid crystal material having a fixed cholesteric structure and having a wavelength selection reflectivity to a wavelength in a non-visible light region.

22. The polarizing plate according to claim 13, wherein the material reflecting a non-visible light contains a non-visible light reflective pigment.

23. The polarizing plate according to claim 13, wherein the transparent patterns are dot patterns.

24. The polarizing plate according to claim 13, wherein the surface film for a polarizing plate reads reflected patterns of the surface film by means of an input terminal capable of irradiating with a non-visible light and detecting it to thereby make it possible to provide information regarding a position of the input terminal on the surface film.

* * * * *